3,097,186
GRAFT COPOLYMER OF A MONOVINYL ARO-
MATIC HYDROCARBON AND A COPOLYMER
OF BUTADIENE AND ISOPROPENYLBIPHENYL
OR VINYLBIPHENYL
Ray W. Kent, Jr., and Frank H. Bolton, Midland, Mich.,
assignors to The Dow Chemical Company, Midland,
Mich., a corporation of Delaware
No Drawing. Filed Feb. 29, 1960, Ser. No. 11,428
4 Claims. (Cl. 260—45.5)

This invention concerns thermoplastic compositions of vinyl aromatic resins and rubbery copolymers of butadiene with isopropenylbiphenyl or vinylbiphenyl. It relates more particularly to high impact compositions of improved transparency, which compositions are prepared by copolymerizing vinyl aromatic compounds with a copolymer of the group consisting of butadiene-isopropenylbiphenyl copolymers and butadiene-vinylbiphenyl copolymers.

Compositions prepared by copolymerizing a minor amount of a rubbery copolymer of butadiene and styrene with vinyl aromatic compounds have good impact and elongation properties but are opaque or translucent, and this property detracts from their utility for many of the purposes for which they are otherwise well suited.

It has now been discovered that thermoplastic compositions suitable for the manufacture of substantially transparent plastic articles having high impact strength and high elongation can readily be prepared by copolymerizing a vinyl aromatic compound with from 1.5 to 8.0 weight percent of a rubbery copolymer of from about 50 to about 80 weight percent butadiene and, correspondingly, from about 50 to about 20 weight percent of a member of the group consisting of isopropenylbiphenyl and vinylbiphenyl. Alternatively, if desired, the rubbery polymer may be a terpolymer containing minor amounts, i.e. 10 weight percent or less, of styrene, and, correspondingly, lesser amounts of the other components. Examples of such vinyl aromatic compounds are styrene, ortho-methylstyrene, meta-methylstyrene, para-methylstyrene, ar-ethylstyrene, ar-vinylxylene, mixtures thereof, and the like.

The rubbery copolymers can be prepared in usual ways, e.g. by polymerizing a mixture of the monomers in the desired proportions in an aqueous emulsion to obtain a synthetic latex or aqueous colloidal dispersion of the copolymer, and copolymerizing with the alkenyl aromatic resin in a similar manner.

Small amounts of additives such as plasticizers, lubricants, fillers, pigments, stabilizers, antioxidants and the like may be incorporated with the polymeric ingredients but are not required. The additives, when used are usually employed in total amount corresponding to not more than 10 percent by weight of the final composition, preferably 5 percent by weight or less.

The compositions of the invention can be molded to form transparent plastic articles such as boxes, cups, sheets, films, toys, combs, etc., useful for a variety of purposes.

The following examples illustrate ways in which the principles of the invention have been applied, but are not to be construed as limiting its scope.

EXAMPLE 1

A rubbery copolymer containing 70 weight percent butadiene and 30 weight percent vinylbiphenyl was prepared by placing a mixture of 45.5 grams of butadiene, 70.6 grams of a mixture of ethylbiphenyl and vinylbiphenyl containing 19.5 grams of vinylbiphenyl, 102.0 grams of water (calculated for 30% solids), 0.325 gram of sodium lauryl sulfate, 0.858 gram of potassium persulfate, 0.13 gram of n-lauryl mercaptan and 0.065 gram of sodium bicarbonate in a 350 cc. citrate bottle in a modified Bendix washer and tumbling for 24 hours at 60° C.

A dispersing agent (0.3 weight percent based on latex), Daxad 11 (a sulfonated alkylnaphthalene-formaldehyde condensation product) was added to the above rubber latex which was then added with vigorous agitation to separate samples of styrene monomer in amounts necessary to prepare compositions containing from 2 to 7 weight percent rubber. The resulting dispersions were polymerized in an open flask equipped with a water-cooled reflux condenser at 110–115° C. for 5 hours using agitation until polymerization had proceeded to 20–25% solids, after which no agitation was used. The water and hydrocarbon diluents were then removed by devolatilization and the resulting polymers injected molded at 25° F. above the short shot temperature. Notched impact (using a bar ½ x 2½ x ⅛ inches), percent elongation (standard Instron) and percent light transmission at 550 mu (Beckman spectrophotometer) were then determined. In a similar manner rubbery latexes containing 80 and 60 weight percent butadiene and, correspondingly, 20 and 40 weight percent vinylbiphenyl, both as pure 3-isomer and as mixtures of about 70 weight percent 3-isomer and 30 weight percent 4-isomer were prepared and copolymerized with styrene to produce copolymers containing from 2 to 7 weight percent of the rubbery copolymer. The physical characteristics of the final products are recorded in the following table.

Table I

| Run | Vinylbiphenyl isomer | Percent butadiene | Percent rubber | Notch impact | Percent elong. | Percent light trans. |
|---|---|---|---|---|---|---|
| 1 | 3 | 70 | 2 | 0.9 | 9.4 | 68 |
| 2 | 3 | 70 | 5 | 1.7 | 26.3 | 28 |
| 3 | 3 and 4 | 70 | 2 | 1.0 | 14.6 | 65 |
| 4 | 3 and 4 | 70 | 5 | 1.9 | 28.4 | 22 |
| 5 | 3 and 4 | 70 | 7 | 2.5 | 31.5 | 15 |
| 6 | 3 and 4 | 60 | 2 | 0.86 | 10.5 | 75 |
| 7 | 3 and 4 | 80 | 2 | 1.0 | 11.5 | 47 |
| 8 | 3 and 4 | 80 | 5 | 2.6 | 31.8 | 12 |
| 9 | 3 and 4 | 76 | 2 | 1.2 | 12.4 | 60 |
| 10 | 3 and 4 | 76 | 5 | 1.4 | 31.1 | 29 |

EXAMPLE 2

A rubbery copolymer of 70 weight percent butadiene and 30 weight percent 3-isopropenylbiphenyl was prepared using the exact procedure of Example 1 except for the use of 60.6 grams of a mixture of isopropylbiphenyl and isopropenylbiphenyl containing 19.5 grams of isopropenylbiphenyl, in place of the vinylbiphenyl monomer mixture. The water calculated for 30% solids was 111 grams. This rubbery copolymer, and other copolymers containing varying percentages of butadiene as shown in the following table, was copolymerized with styrene as in Example 1 to prepare products containing varying percentages of the rubber as indicated. The rubbery copolymer containing the 4-isomer was made with pure 4-isopropenylbiphenyl. The physical properties of the products were tested with the results which follow.

Table II

| Run | Isopropenylbiphenyl isomer | Percent butadiene | Percent rubber | Notch impact | Percent elong. | Percent light trans. |
|---|---|---|---|---|---|---|
| 1 | 4 | 70 | 2 | 1.2 | 10 | 64 |
| 2 | 4 | 70 | 5 | 2.5 | 35 | 20 |
| 3 | 4 | 62 | 2 | 1.0 | 5 | 81 |
| 4 | 4 | 62 | 5 | 1.6 | 22 | 41 |
| 5 | 3 | 70 | 2 | 1.2 | 10 | 60 |
| 6 | 3 | 60 | 2 | 1.0 | 9 | 72 |
| 7 | 3 and 4 | 70 | 2 | .99–1.4 | 10.5–14.0 | 59–65 |
| 8 | 3 and 4 | 70 | 5 | 1.7–2.5 | 28.0 | 18–25 |
| 9 | 3 and 4 | 70 | 7 | 3.1 | 36.7 | 12 |
| 10 | 3 and 4 | 60 | 2 | 0.82 | 5.9 | 77 |
| 11 | 3 and 4 | 80 | 2 | 0.85 | 8.1 | 46 |
| 12 | 3 and 4 | 80 | 5 | 2.9 | 31.7 | 9 |

EXAMPLE 3

A rubbery terpolymer containing 65 weight percent butadiene, 30 weight percent of 3-isopropenylbiphenyl and 5 weight percent of styrene was prepared as in Example 1, and thereafter copolymerized with styrene to give a product containing 2 weight percent of the rubbery terpolymer. The resulting product was injection molded and tested as in Example 1.

Notched impact _____ 1.2
Percent elongation _____ 10.0
Percent light trans_____ 69.0

EXAMPLE 4

A rubbery terpolymer as in Example 3 was prepared using a mixture of about 70 weight percent 3- and 30 weight percent 4-isopropenylbiphenyl in place of the 3-isopropenylbiphenyl. When polymerized with styrene to give a product containing 5 weight percent of the rubbery terpolymer the final product had the following characteristics:

Notched impact _____ 2.2
Percent elongation _____ 28.0
Percent light trans_____ 16.0

When polymerized with styrene to give a product containing 2 weight percent of the rubbery terpolymer the resulting product had the following properties:

Notched impact _____ 1.2–1.36
Percent elongation _____ 9.0–12.4
Percent light trans_____ 53.0

Various modifications may be made in the present invention without departing from the spirit or scope thereof, and it is understood that we limit ourselves only as defined in the appended claims.

We claim:

1. A composition of matter consisting essentially of an interpolymer of (1) from 92 to 98.5 percent by weight of a monovinyl aromatic hydrocarbon of the benzene series having the vinyl radical directly attached to a carbon atom of the benzene nucleus and containing from 8 to 10 carbon atoms in the molecule, and (2) from 8 to 1.5 percent by weight of a rubbery copolymer of from 50 to 80 percent by weight of butadiene and from 50 to 20 percent by weight of a monomer selected from the group consisting of isopropenylbiphenyl and vinylbiphenyl.

2. The composition of claim 1, wherein the vinyl aromatic hydrocarbon is styrene.

3. The composition of claim 2, wherein the rubbery copolymer is a copolymer of butadiene and isopropenylbiphenyl.

4. The composition of claim 2, wherein the rubbery copolymer is a copolymer of butadiene and vinylbiphenyl.

References Cited in the file of this patent

UNITED STATES PATENTS 2,419,202    D'Alelio _____ Apr. 22, 1947
2,606,163    Morris et al. _____ Aug. 5, 1952

OTHER REFERENCES

Whitby, "Synthetic Rubber," pages 690–692, 1954, Wiley & Sons, New York.